UNITED STATES PATENT OFFICE.

GADIENT ENGI AND CARL JAGERSPACHER, OF BASEL, SWITZERLAND, ASSIGNORS TO SOCIETY OF CHEMICAL INDUSTRY IN BASLE, OF BASEL, SWITZERLAND.

PROCESS FOR THE MANUFACTURE OF COPPER COMPOUNDS OF ORTHOOXYAZO DYESTUFFS.

1,237,183.     Specification of Letters Patent.     Patented Aug. 14, 1917.

No Drawing.     Application filed November 27, 1915. Serial No. 63,829.

*To all whom it may concern:*

Be it known that we, Dr. GADIENT ENGI and Dr. CARL JAGERSPACHER, both chemists, citizens of the Swiss Republic, and residents of Basel, Switzerland, have invented a new Process for the Manufacture of Copper Compounds of Orthooxyazo Dyestuffs, of which the following is a full, clear, and exact specification.

In the United States Letters Patent No. 1216760 and No. 1216812 and in the United States application for Letters Patent Ser. No. 54504 of Berthold Wuth and Carl Jagerspacher, filed October 7, 1915 is described a process for the manufacture of copper compounds of orthooxyazo dyestuffs, soluble in water consisting in treating orthooxyazo dyestuffs with copper compounds in presence of a solvent. The copper compounds thus prepared possess the valuable property to dye animal fibers in acid baths vivid tints which are fast to light, washing and alkalis without any subsequent treatment.

We have now found that instead of starting from the orthooxyazo dyestuffs and acting with copper compounds on their solutions, the new copper compounds can also be obtained by effecting the combinations of orthooxydiazophenol- or orthooxydiazonaphthol derivatives with azo dyestuff components, in presence of copper compounds. Thus the copper compounds of the orthooxyazo dyestuffs are produced directly and can be isolated eventually after addition of common salt, by filtration, washing and drying.

Thereby we have made furthermore the valuable observation that generally the combinations in presence of copper compounds occur more easily than according to the hitherto usual methods. The combination is facilitated in such a manner, that certain combinations, which could not be carried out or could only be carried out with low outputs according to the usual methods, can be executed now easily and with excellent yields by effecting the combination in presence of copper compounds. While for instance the combination of the diazo derivative of 1:2:4-amin. naphtholsulfonic acid with 1:5-naphtholsulfonic acid was, according to the known methods, for instance in concentrated soda alkaline solution, very incomplete and proceeds therefore with extremely low yields, the yields of copper compounds of the said orthooxyazo dyestuff obtained according to the new process in presence of copper salts are almost quantitative.

The new process is illustrated by the following examples:

Example 1: To a concentrated solution of 25 parts 1:5-naphtholsulfonic acid and of 40 parts sodium carbonate in water is added, while stirring, a solution of 24 parts copper sulfate in 60 parts water. In the thus obtained solution is let to flow, while stirring, the diazo derivative of 24 parts of 1:2:4-aminonaphtholsulfonic acid, prepared in the known manner. After a stirring for 24 hours at ordinary temperature, the reaction mass is heated progressively to 40° C. and maintained at this temperature till the combination is achieved. After separation of the copper hydroxid in excess by filtration, the copper compound is precipitated from the solution by adding common salt. It dissolves in water with violet-red and in concentrated sulfuric acid with blue coloration and dyes wool in an acid bath pure violet tints fast to light, washing and alkalis.

Example 2: To the solution of the diazo derivative of 18.9 parts orthoaminophenolsulfonic acid, neutralized with sodium carbonate, is added a solution of 25 parts crystallized copper sulfate in 60 parts water and the mass is then poured, while stirring, into a concentrated solution of 14.4 parts betanaphthol, 13 parts soda lye of 30% and 30 parts sodium carbonate. After the combination is achieved, the mass is—if desired after it has been diluted previously with water—heated till solution takes place, the solution separated by filtration from the copper hydroxid in excess and the copper compound of the dyestuff precipitated from the filtered solution by adding common salt. It is identical with one of the dyestuffs already described in the United States Letters Patent No. 1216760.

Example 3: The diazo derivative of 22 parts picramic acid prepared in the known manner is poured, while stirring, into a concentrated soda alkaline solution of 32 parts 1:8:3:6-aminonaphtholdisulfonic acid and 40 parts sodium carbonate, a cuprous chlorid paste containing 15 parts $Cu_2Cl_2$ having been added to the said solution before its union with the diazo compound.

The combination being effected the dyestuff solution is delivered from the copper hydroxid by filtering and the copper compound of the dyestuff is salted out from the filtered liquid. It is identical with one of the copper compounds described in the application for United States Letters Patent Ser. No. 43413.

In an analogous manner the various orthooxydiazo compounds can be combined with the convenient components in presence of copper compounds.

What we claim is:

1. The described process for the manufacture of copper compounds of dyestuffs which consists in combining, in the presence of a copper compound, two azo dyestuff components one of which is an orthooxydiazo compound of the aromatic series.

2. The described process for the manufacture of copper compounds of dyestuffs, which consists in combining an orthooxydiazo compound of the aromatic series with a naphtholic compound in presence of a copper compound.

3. The described process for the manufacture of copper compounds of dyestuffs, which consists in combining an orthooxydiazo compound of the aromatic series with a naphtholsulfonic compound in presence of a copper compound.

4. The described process for the manufacture of copper compounds of dyestuffs, which consists in combining an orthooxydiazo compound of the aromatic series with an aminonaphtholsulfonic compound in presence of a copper compound.

In witness whereof we have hereunto signed our names this 21st day of October 1915, in the presence of two subscribing witnesses.

Dr. GADIENT ENGI.
Dr. CARL JAGERSPACHER.

Witnesses:
ARNOLD ZUBER,
AMAND RITTER.

Copies of this patent may be obtained for five cents each, by addressing the "Commissioner of Patents, Washington, D. C."